May 8, 1956 O. D. GRANDSTAFF 2,745,008

ELECTRONIC TONE GENERATOR

Filed Oct. 8, 1952 4 Sheets-Sheet 1

INVENTOR.
OTHO D. GRANDSTAFF

BY McWatters Owen.

ATTY.

May 8, 1956 O. D. GRANDSTAFF 2,745,008
ELECTRONIC TONE GENERATOR
Filed Oct. 8, 1952 4 Sheets-Sheet 2

INVENTOR.
OTHO D. GRANDSTAFF
BY Wm. Watts Owen
ATTY.

INVENTOR.
OTHO D. GRANDSTAFF
BY Wm. Watts Owen
ATTY.

OUTPUT: 600/120 CPS

*INVENTOR.*
OTHO D. GRANDSTAFF
*BY* Wm. Walter Owen.
ATTY.

2,745,008

ELECTRONIC TONE GENERATOR

Otho D. Grandstaff, Oak Park, Ill., assignor to Automatic Electric Laboratories, Inc., Chicago, Ill., a corporation of Delaware Application October 8, 1952, Serial No. 313,688

11 Claims. (Cl. 250—36)

This invention relates to signal tone generators and is specifically directed to an electronic signal tone generator for use in a telephone system where a need exists for several signal tones such as dial tone, busy tone, ringback tone, and others to indicate to the calling party that particular conditions exist on the called or calling line.

An object of the invention is to provide a single unit equipment capable of supplying dial, busy, and ringback tones generated by electronic means rather than by rotating electrical machinery heretofore used in the telephone industry.

Another object comprises the novel means utilized for modulating the output of a relatively high frequency oscillator with the alternating current of the source at the rate of 120 C. P. S. the alternation frequency, said modulator means excluding the use of electronic components.

Another object entails the use of a low frequency oscillator with a special circuit adaptation for the purpose of modulating the output signal of a relatively high frequency oscillator.

A further object consists in the use of a special resistor and associated circuit within the low frequency oscillator to vary the output signal of the relatively high frequency oscillation of another oscillator which output signal is impressed across the amplifier section.

A feature, which insures stable operation and elimination of distortion in the amplifier stages, is the introduction of the proper amount of feedback voltage from the output into the input stages of the amplifier.

Other objects and advantages will appear from the following description and the accompanying drawing consisting of four figures.

Figure 1:
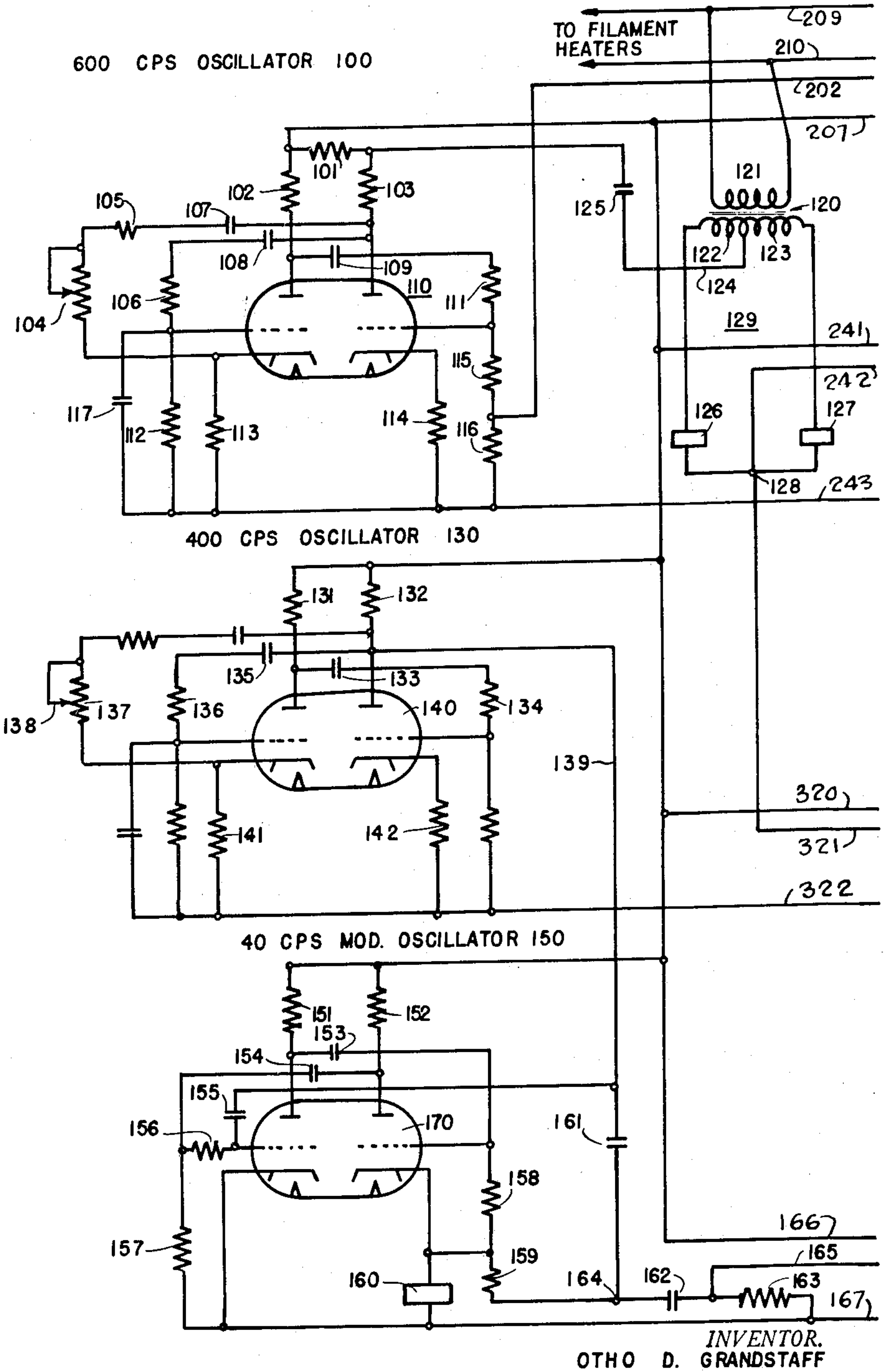

Figure 1 contains all three of the oscillators utilized in the present invention. The 600 cycle oscillator and the 400 cycle oscillator supply relatively high frequency, as compared to the power frequency of 60 cycles, are used for generation of the dial and the busy tones. The 40 cycle oscillator 150 is used to modulate the output of the 400 cycle oscillator 130. A non-electronic modulator consisting of the transformer 120 and the non-linear resistors 126 and 127 is used to modulate the output of the 600 cycle oscillator 100.

Figure 2:
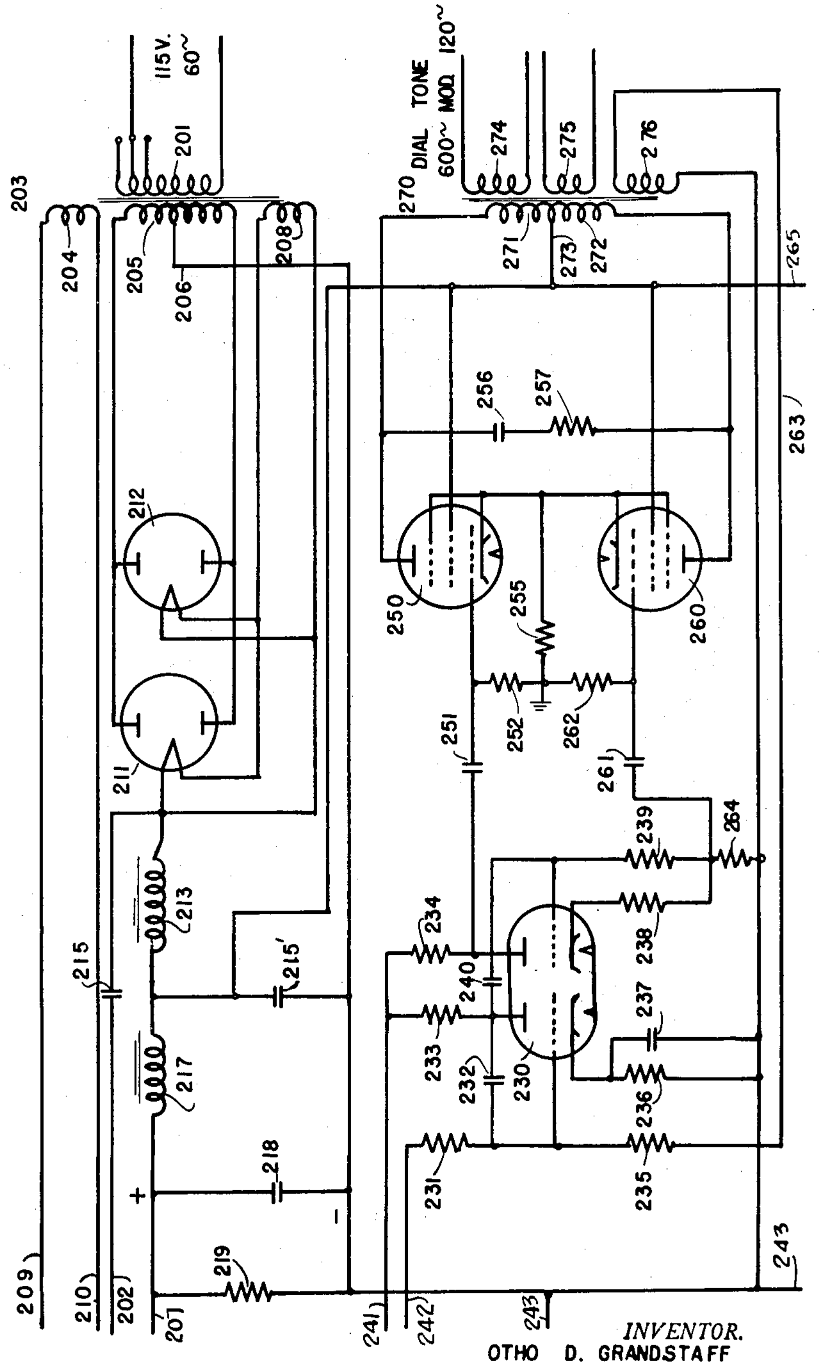

Figure 2 contains the rectifier stage which is the source of D. C. potential for all the oscillator and amplifier stages. The lower portion of the figure shows the amplifier stage for the output of the dial tone.

Figure 3:
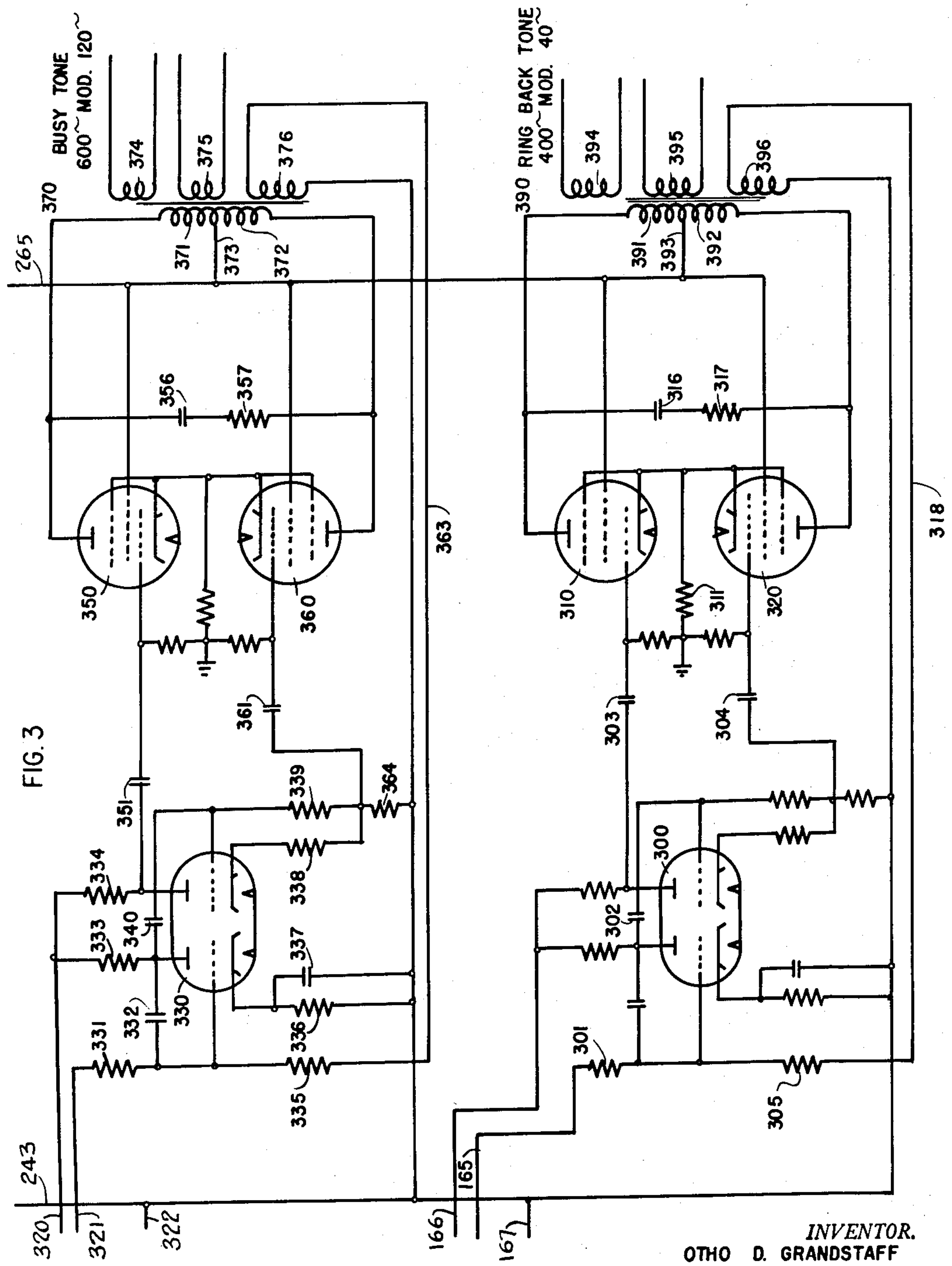

Figure 3 shows the two amplifier stages: one used for the output of the busy tone and the other for the output of the ring-back tone.

Figure 4A:
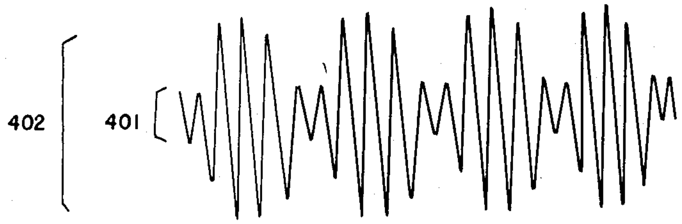
Figures 4B, 4C:
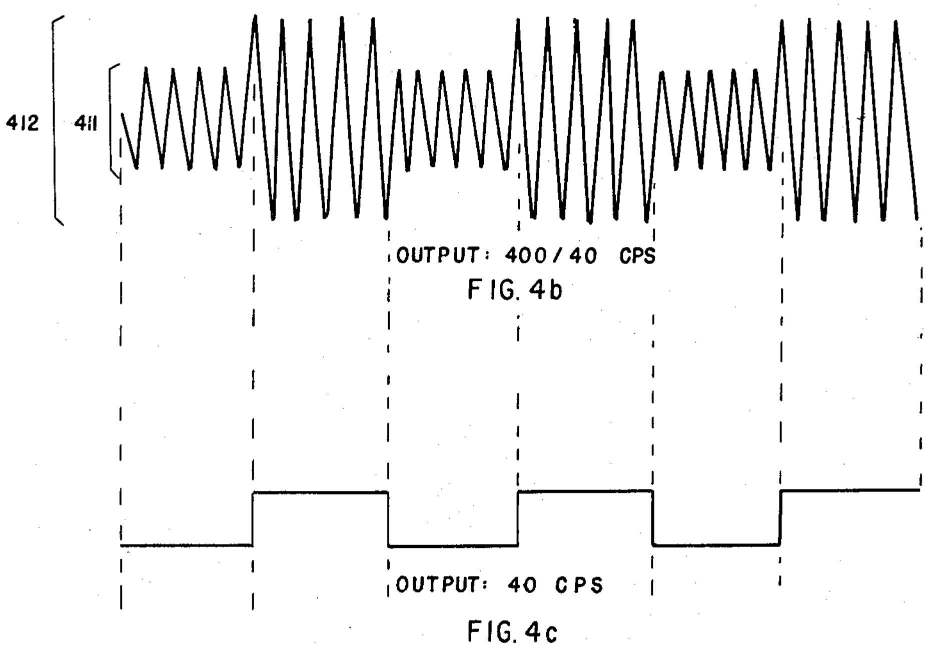

Figure 4 contains oscillographic records of the three different outputs of this equipment, namely the 600 C. P. S. signal modulated by the 120 C. P. S. signal (600/120), the 400 C. P. S. signal modulated by the 40 C. P. S. signal (400/40), and the 40 C. P. S. output of the modulating oscillator 150.

The output of the oscillator 100, which consists of

600 C. P. S. alternating current, is introduced across the capacitor 125 into the non-electronic modulator composed of transformer 121, the non-linear resistors 126 and 127, and the associated circuit. This 600 C. P. S. alternating current is modulated at 120 C. P. S. by alternation frequency of the power source obtained from winding 204 of the transformer 203 over the lines 209 and 210 and introduced into the transformer 120 via its winding 121. The characteristics of the modulated output are dependent upon the relation of the resistance value of the non-linear resistors 126 and 127 to the impedance value of the network consisting of resistors 231 and 331, 235 and 335, and the windings 276 and 376. Thereafter the output at point 128 is fed into two identical amplifier stages where it is amplified and fed into the output transformers 270 and 370 where it appears as dial and busy tone.

The output of the oscillator 130, which consists of a 400 C. P. S. alternating current is impressed across the capacitor 161 to the point 164. The operation of the oscillator 150 at 40 C. P. S. causes alternating current to flow through the non-linear resistor 160, situated in the plate-cathode circuit of the right-hand side of the tube 170, and to vary the impedance value existing between the point 164 and ground. This periodic variation of impedance affects the magnitude of the alternating voltage impressed across the impedance by the oscillator 130 which in turn is applied thereafter to the grid of a first tube in the amplifier stage.

The amplified output appears as ring-back tone at the transformer 390. Modulation characteristics are dependent upon the relation of the resistance value of 159 and 160 to the impedance value of 162 and 163.

A unique feature of the invention consists of the use of non-linear resistors, such as silicon carbide, for modulating the 600 cycles per second output of the 600 cycle oscillator 100 with 120 cycles per second signal obtained from a power source. This results in an output containing the desired wave of three cycles of high amplitude indicated by 402 and two cycles of low amplitude shown by 401 in the Fig. 4 (*a*). The ratio of amplitudes 401 and 402 is 3:10. The ratio of three high waves to two low waves is due to selection of proper resistance values of 126 and 127 so as to present a particular proportion to the total resistance network consisting of the secondary winding on transformer 120, the two resistors 126 and 127, and the two parallel branches: 231, 235, and 276; and 331, 335, and 376. The modulating power is obtained from the step-down winding 204 of transformer 203 over the line 209 and 210 to the transformer 120. Winding 204 is also used to provide filament voltage, approximately 6.3 volts, for all the tubes except the rectifier tubes 211 and 212.

The modulating power is stepped up by means of the transformer 120 to a magnitude of approximately 50 volts on each side of the center tap 124. Current from this transformer flows through the silicon carbide discs 126 and 127 which change to a lower resistance on both the negative and the positive peaks of the 60 C. P. S. current induced in the transformer 120. The 600 C. P. S. oscillatory current, introduced at the center tap 124 of the transformer 120 and applied through the non-linear resistors 126 and 127 to the point 128, is further connected to a proportioning network composed of two identical branches which are in parallel. One branch contains resistors 231 and 235 including the feed back winding 276 on transformer 270; the other, resistors 331 and 335 including the feed back winding 376 on the transformer 370.

The flow of electrons through the modulator 129 and the oscillator 100 will now be described at the moment when the polarity of the voltage across the transformer 121 is such that the outer end of the winding 122 is + and the outer end of the winding 123 is —: local electron flow is from the right side through the secondary windings 123 and 122, the non-linear resistor 126, the point 128, and the non-linear resistor 127 back to the right side of the secondary winding; the external flow of electrons is from ground through the winding 276 on the transformer 270, over the line 263, through the resistors 235 and 231, to the point 128, through the non-linear resistor 127, through the winding 123, over the center tap 124 and the capacitor 125 to the junction of the resistors 101 and 103, resistor 101 to the + supply on the filter. On the next half of the cycle, the voltage across the secondary winding of the transformer 120 reverses so that the outer end of the winding 123 becomes + and the local electron flow is from the left side through the secondary windings 122 and 123, the non-linear resistor 127, the point 128, and the non-linear resistor 126 back to the left side of the secondary winding; the external flow of electrons being similar to that described hereinbefore except that the electrons after entering point 128 go through the non-linear resistor 126, the secondary winding 122 and out over the center tap 124 over a path previously described.

The combined effect of two different electron flows superimposed upon each other creates the presence of a particular voltage condition existing at point 128 which in turn is impressed upon grids of tubes in the amplifier stages. This type of non-linear resistor exhibits a high resistance to regular operating voltage (600 C. P. S.) but when another voltage (120 C. P. S.) is impressed upon it, the inherent resistance drops to a low value with the result that effective modulation is achieved in a novel way. Thus the 600 C. P. S. current introduced at the center tap 124 flows more readily at intervals of 120 times per second.

By properly proportioning the load resistance and the non-linear resistors and by having a modulating voltage high compared to the 600 C. P. S. voltage, the desired modulation is readily obtained. The modulated voltage across the load resistor such as 231 and 235, is amplified by a conventional amplifier using a large amount of negative feed back to furnish the required output with good voltage regulation. One amplifier section consisting of tubes 230, 250 and 260 is used to amplify the modulated 600 C. P. S. oscillatory current to obtain dial tone output; the other section composed of the tubes 330, 350 and 360 is used to amplify the same modulated signal to achieve busy tone output. The busy tone is interrupted externally by a conventional interrupter and introduced to connecting equipment, but these interruptions do not affect the dial tone output due to the isolation provided by the separate amplifiers.

The ring-back tone circuit provides a particular alternating current tone now considered as standard which consists of 400 C. P. S. alternating current modulated by a 40 C. P. S. oscillating output. This tone has five cycles of large amplitude indicated by 412 and five cycles of low amplitude as shown by 411 in the Fig. 4(*b*). A 400 C. P. S. Wien bridge oscillator 130, similar to the 600 C. P. S. oscillator 100, and a 40 C. P. S. multivibrator type oscillator 150, producing symmetrical square waves are used. A single non-linear resistor 160 in conjunction with the 40 C. P. S. oscillator 150 is used to effect modulation upon the 400 C. P. S. oscillator output impressed across a load network. This resistor 160 is used as the cathode resistor in the right (R) section of the 40 C. P. S. oscillator tube 170. Resistor 160 is connected through the resistor 159 (low value) to the point 164, to which is connected a parallel branch consisting of the blocking capacitor 162 and the resistor 163. Whenever the R triode of tube 170 conducts, the resistance of resistor 160 drops to a very low value and therefore presents a low impedance ground to the point 164 thereby effectively decreasing the magnitude of the voltage existing between point 164 and ground from which point it is impressed upon the L grid of the tube 300. Whenever the L triode of tube 170 conducts, the resistance of 160 is very high (nearly an open circuit) with a consequent presence of high signal voltage found at point 164. The variation of oscillatory voltage existent between point 164 and ground is reflected over the line 165 to the L grid of the buffer amplifier section of the tube 300. The voltage is then amplified by an amplifier section identical to those sections used for amplifying the dial and busy tones.

Applicant's invention may be roughly divided into the following operating sections: the power supply including the filter and the rectifier, the oscillators and their associated amplifiers, the resistance modulator and the modulating oscillator. Each of the amplifier sections in turn consists of three stages: buffer amplifier, phase inverter and power amplifier. All of the amplification sections are similar to each other.

The power supply contains a transformer 203 for transforming the regular power frequency voltage into an output consisting of several voltages obtainable at the windings 204, 205, and 208. Several taps are shown available on the primary side of the transformer 203 to allow proper connection to a voltage supply source which may be above or below the usual normal value of 115 volts. This stage contains two rectifier tubes, 211 and 212, connected in parallel across the secondary winding 205 of the power transformer 203. The tubes used for rectifying purposes may be of the commercial type known as 5U4G. The output of the rectifier stage is fed into a choke input filter comprising a network containing the chokes 213 and 217 and the capacitors 215′ and 218. A bleeder resistor 219 is connected across the output of the filter to discharge the capacitors 215 and 218 so as to protect the maintenance personnel from high voltage shocks which may occur after the equipment has been shut down.

The dial tone generator comprises a 600 C. P. S. oscillator 100, a resistance modulator 129 including transformer 120 and the resistors 126 and 127, and the amplifier section containing tubes 230, 250 and 260. The oscillator section uses a duplex tube, such as the commercial tube 6SN7GT, in conjunction with its associated resistors and capacitors. The L (left) section of the oscillator tube 110 forms a part of the oscillator circuit comprised of the cathode resistor 113, the plate resistor 102, the grid bias resistor 112, and the regulating feed back resistor 104 connected through the resistor 105 and the capacitor 107 to the plate of the R (right) section of the same tube. The circuit of the R section of the oscillator tube 110 consists of the cathode resistor 114, the plate resistors 101 and 103, the grid bias resistors 115 and 116, and also the resistor 111 connecting through the capacitor 109 to the L plate of the same tube. These two sections of the tube 110 and the associated resistors and capacitors are so connected as to form a Wien bridge type of resistance-capacitance oscillator.

Whenever the L section of the tube 110 conducts, changes in plate current are impressed through the capacitance 109 and the resistor 111 upon the grid of the R section of the same tube. The R section amplifies this signal and a portion of the amplified signal is regeneratively fed back over capacitor 108 and the resistor 106 to the L grid of the tube. The resulting change in the voltage on the L grid of the tube causes a corresponding change in the plate current thereof which in turn causes a change in the voltage of the R grid of the same tube which in turn results in a change of the plate current of the R section of the tube. This in turn results in a change on the L grid of the tube. An electron oscillatory motion is thus established and the frequency of oscillation in the output of this Wien bridge oscillator will be determined by the value of the resistors 104 and 112 and the corresponding capacitance 117. The output of the R section of the tube 110 is connected from the junction of resistors 101 and 103 through the capacitor 125 to the center tap 124 of the secondary winding on the transformer 120 of the resistance modulator 129.

Capacitor 215 serves as a synchronizing agent by applying the dip in the voltage, existing between two adjacent rectified pulses, to the junction of the resistors 115 and 116 and thereafter over the resistor 115 to the R grid of the tube 110. This results in stable operation of the oscillator 100 which frequency of output will have a certain relation to the alternation or the rectification frequency, namely 600 to 120 or 5 to 1. Resistor 104 serves to control the amount of feedback from the R plate of tube 110 to the L cathode of same tube so as to obtain a good sine wave output. The primary winding 121 of the transformer 120 is connected over the lines 209 and 210 to the low voltage filament supply output transformed by the power transformer 203. Each end of the secondary windings 122 and 123 on the transformer 120 is connected to a non-linear resistor 126 and 127, such as the silicon carbide type, and tied together at the lower end so as to form a modulating circuit which is used to modulate the inputs fed into the dial tone and the busy tone amplifier stages at the point 128.

At this time, the dial tone amplifier stage will be considered in connection with the associated 600 C. P. S. oscillator 100 used for generating the dial tone alternating current. The output of the oscillator stage 100 is taken through the capacitor 125 and through the center tap 124 and the secondary windings 122 and 123 on the transformer 120 through either one of the resistors 126 and 127, and through the resistor 231 to the L grid of the tube 230 serving a dual function both as a buffer amplifier and a phase inverter. The purpose of the buffer amplifier contained in the L section of the tube 230 is to isolate the oscillator stage from the output stage thereby keeping the frequency unaffected by variations in the load. The plate-cathode circuit of the buffer amplifier consists of the plate resistor 233 and the cathode resistor 236. Resistor 235 is in series with the winding 276 of the transformer 270; its purpose is to allow a certain amount of feed back voltage from the output transformer 270 to be impressed upon the L grid of the tube 230. The amount of voltage fed back to the first stage of the amplifier section is sufficient to give good voltage regulation and to eliminate distortion which may occur in the amplifying train. Variations of the plate current flowing through the L section of the tube 230, the buffer amplifier, are passed across the capacitor 240 to the R grid of the tube 230 which right section functions as a phase inverter. Both of the plate resistors 233 and 234 of the tube 230 connect to the rectified power available at the output of the filter. The phase inverter serves the function of converting the output from the buffer amplifier section of the tube 230 into two out-of-phase components equal in magnitude for exciting the control grids of the power amplifier tubes 250 and 260. The phase inverter gives an equal voltage feeding into the power amplifier without unbalance caused by aging tubes or other causes. The current flow changes in the phase inverter section of the tube 230 are impressed upon the grids of the power amplifier tubes 250 and 260 by means of the capacitors 251 and 261. The grid bias for the amplifier tubes 250 and 260 is obtained by means of the resistors 252 and 262 which are connected together to ground. The tubes used in the power amplifier stage may be of the commercial type known as 6V6GT. The plates of the power amplifier tubes are connected to the opposite ends of the windings 271 and 272 of the transformer 270. The secondary winding of the transformer 270 is center tapped at 273 and connects to the junction of capacitor 215′ and the chokes 213 and 217 within the filter for a source of D. C. supply voltage. Capacitor 256 and resistor 257 are placed in series across the output of the power amplifier stage to suppress high frequency oscillations. The amplified output of the 600 C. P. S. oscillator 100 is taken off from the transformer 270 by means of the two windings 274 and 275. These windings contain the same number of turns and can be connected in series so as to give an output of twice the voltage of a single winding. This is very convenient for adapting the output of this oscillator to equipment which may vary in electrical characteristics. The other winding 276, shown in the output side of the transformer 270, as has been previously explained, allows a certain portion of the output voltage to be fed back over the line 263 through the resistor 235 to the L grid of the tube 230.

The 600 C. P. S. oscillator 100 is kept in synchronization with the frequency of 120 C. P. S., the ripple frequency of the rectifier, by means of the capacitor 215 which is connected to the output of the rectified power supply over the line 202 to the junction of the resistors 115 and 116 and thereafter through the resistor 115 to the R grid of the oscillator 100. This eliminates erratic operation of the oscillator 100 and preserves a relationship between the two frequencies which is necessary because of the use of the lower frequency for modulating the higher frequency.

The output of the oscillator 100 is also taken off from the modulator 129 at point 128 through the resistor 331 and is impressed upon the L grid of the tube 330 which left section serves as a buffer amplifier. The modulated output of the 600 C. P. S. oscillator thereby serves to provide a signal for the busy tone oscillator stage which output is comprised of 600 c. p. s. alternating current modulated by 120 C. P. S. alternating current. The plate-cathode circuit of the L section of the tube 330 consists of the plate resistor 333 and the cathode bias resistor 336. The plate current variations in the L section of tube 330 are impressed across the condenser 340 to the grid in the R section of tube 330 which functions as a phase inverter. The plate of the R section of tube 330 is connected to the rectified output of the power supply through the resistor 334. The cathode bias is obtained by way of resistors 338 and 364. The R section of tube 330 functions as a phase inverter in the manner previously described for the amplifier section used for the dial tone output. Two signals of the same magnitude but out of phase with each other are impressed through the condensers 351 and 361 upon the grids of the power amplifier tubes 350 and 360. The output of this push-pull amplifier is impressed across the windings 371 and 372 of the transformer 370. The capacitor 356 and the resistor 357 which are connected in series across the two plates of the tubes 350 and 360 have a similar function, as the previously mentioned resistor 257 and capacitance 256, for suppressing high frequency oscillations. The output of the transformer 370 is taken out from two windings 374 and 375. These two windings have equal number of turns and may be connected in series if desired for matching the electrical rating of the connecting auxiliary equipment. The output from the winding 376 is used to impress a feed back voltage over line 363 through the resistor 335 upon the L grid of the tube 330 in order to improve the amplification characteristics of the busy tone amplifier section.

The 400 C. P. S. oscillator which is used to provide the fundamental frequency for the ring-back tone is also of the Wien bridge oscillator type. A duplex tube 140 is used for this purpose and may be of the commercial type 6SN7GT. The respective plate resistors 131 and 132 are connected together to the rectified voltage output of the filter. The cathode resistors are 141 and 142 which are used for supplying the cathode bias. The output of the R section of tube 140 is connected through capacitor 135 and the resistor 136 to the L grid of tube 140. Likewise the output of the L section of tube 140 is fed through the capacitor 133 and the resistor 134 to the R grid of tube 140. It is evident thereby that the change in one section of the tube 140 will effect a change in the other section of the same tube. The operation of the 400 C. P. S. oscillator is similar to that described previously in discussion on the 600 C. P. S. oscillator 100. The amount of feedback obtained from the R plate of the tube 140 and impressed upon the L cathode of the same tube is controlled by the adjustment of the center tap 138 on the resistor 137. The oscillating current is taken from the R plate of the tube 140 and directed over line 139 across the capacitor 161 to the point 164 where it is modulated by the oscillations of the 40 C. P. S. modulating oscillator 150 hereinafter described.

The 40 C. P. S. modulating oscillator 150 is of the well known multivibrator type wherein one section of the tube 150 conducts while the other section of the same tube becomes biased to cut-off. Oscillations are started by a momentary unbalance, say by a more positive voltage existing on the grid of the L section of tube 150 than on the grid of the R section of the same tube. This voltage is amplified and then impressed across the L grid to be re-amplified. This is a cumulative and an instantaneous action so that the L grid rises abruptly to a positive value, while the R grid potential just as suddently becomes more negative than the cut-off value for this particular tube. As a result amplification ceases and the L triode of the tube 170 draws a heavy plate current while the R triode takes no plate current. But this situation is only momentary because the leakage through the resistance comprised of 158 and 160 of the R triode brings the grid potential on grid of R triode back to zero. When the negative potential on the grid of R triode has dropped sufficiently so that amplification is possible, some minute voltage will start amplification in the R triode, operation of which is reversed to that previously described for the L triode. Capacitor 155 impresses some of the output from the R plate of the tube 140 upon the L grid of the tube 170 so that the 40 C. P. S. modulating oscillator 150 stays in synchronization with the 400 C. P. S. oscillator 130 in order to preserve the relationship existing between the fundamental frequency and the modulating frequency.

The R section of the tube 170 contains a nonlinear resistor 160, which may be of the silicon carbide type, in its cathode circuit. When the L section of tube 170 is conducting, the resistance value of the resistor 160 is high because the R section of tube 170 is not conducting. As a result, the resistance value at point 164, to which is connected the resistor 159 which in turn is connected to the junction of the resistors 158 and 160, is high. The output of the 400 C. P. S. oscillator 130, which has been brought over the line 139 across the capacitor 161, connects to one side of the resistor 159 and across the capacitor 162 and the resistor 301 to the L grid of the tube 300 of which the L section serves as a buffer amplifier. Capacitor 162 serves in a manner to block out the D. C. potential from the L grid of the tube 300. Whenever the R section of tube 170 conducts, the resistance value of the cathode resistor 160 is very low so that the combined output of the 400 C. P. S. oscillator 130 and the 40 C. P. S. modulating oscillator 150 is low with the result that a low voltage signal, at the point 164, is impressed across the capacitor 162 and then through the resistor 301 upon the L grid of the tube 300. The resistance of the cathode resistor 160 is about 300K ohms which is practically an open circuit when the R section of the tube 170 is not conducting and hence the full signal voltage from the R plate of the tube 140 is applied via the capacitors 161 and 162, and the resistor 301 to the L grid of the tube 300. The resistance value of the resistor 159 is small in comparison to that of resistor 160. The resistor 159 is of such magnitude that the voltage developed at the junction of the resistor 163 and the capacitor 162 is such that the amplitude of the signal voltage during the conduction of the R section of tube 170 is one-half of the signal voltage when the R section of the said tube is not conducting. This is indicated by wave magnitudes 411 and 412 in Fig. 4(*b*).

The output of the L section of tube 300, serving as a buffer amplifier, is connected through the capacitor 302 and impressed upon the R grid of the same tube. The R triode of the tube 300 functions as a phase inverter to provide two signals of equal magnitude but of opposite polarity to the next stage, an amplifier stage consisting of two tubes 310 and 320 which are used together as a push-pull power amplifier. The signals from the phase inverter are impressed upon the grids of the power amplifier tubes 310 and 320 via the capacitors 303 and 304. The resistor 311 serves as a common bias for both of the cathodes of the amplifier tubes. The output of the amplifier tubes is connected to the windings 391 and 392 of the transformer 390. The capacitor 316 and the resistor 317 are connected in series across the plates of the two amplifier tubes 310 and 320 for the purpose of suppressing high frequencies oscillations. The output of the transformer 390 consists of two windings 394 and 395. These windings, as in the other instances, consist of two equal-turn windings which may be connected in series whenever desired. Winding 396 serves to channel some of the output signal over the line 318 through the resistor 305 to be impressed upon the L grid of the tube 300 to stabilize the output in a manner which is employed in feed back circuits.

While there has been described what is at present considered to be the preferred embodiment of the invention it will be understood that various modifications may be made herein and it is intended to cover in the appended claims all such modifications as fall within the true spirit and scope of the invention.

What is claimed is:

1. An electronic tone generator comprising an oscillator, an amplifier, an alternating current power supply providing an alternating current source for said generator, modulating means having a plurality of input circuits, said modulating means possessing inherent variable characteristics, circuit means for connecting said oscillator to one of said input circuits of said modulating means, circuit means for connecting said alternating current source to another of said input circuits of said modulating means to provide an alternating current therein, a tapped network, said modulating means connected to said amplifier through said tapped network, said modulating means effective to combine the alternating current output of said oscillator and a portion of the alternating current output of said power supply to produce a predetermined composite output signal and to apply said composite signal to said network, said amplifier effective in response to receipt of said composite signal from said tapped network to amplify said composite signal to the desired signalling magnitude.

2. In an electronic tone generator as claimed in claim 1, circuit means for connecting said alternating current power supply to said oscillator, a portion of the alternating current output of said alternating current power supply controlling the operation of said oscillator in a predetermined manner.

3. An electronic tone generator comprising an oscillator, an amplifier, an alternating current power supply for said generator, modulating means comprising nonlinear resistors and several inputs electrically connected in a circuit with said non-linear resistors, a proportioning network, said network connected to said modulating means and said amplifier, and circuit means for connecting the output of said oscillator and a portion of the output of said alternating current power supply to said inputs of said modulating means, said modulating means effective in response to the receipt of alternating currents from said oscillator and alternating currents from said power supply to combine said input currents into a predetermined composite output, said amplifier effective upon receipt of said composite output to amplify said composite output to thereby produce an output consisting of a plurality of wave shapes bearing a certain relation to each other with respect to magnitude and number as predetermined by the relation of the resistance values of the non-linear resistors to that of the proportioning network.

4. An electronic tone generator comprising an oscillator for producing an alternating current of a first frequency, amplifying means, a power supply for said generator producing an alternating current of a second frequency, modulating means including frequency doubling means and having a plurality of inputs, circuit means for connecting said oscillator to one of said inputs of said modulating means, circuit means for connecting said power supply to one of said inputs of said modulating means, and a tapped network, said modulating means connected to said amplifying means through said tapped network, said modulating means effective in response to the receipt of said alternating currents of said first and second frequencies to double said second frequency and to combine said alternating current of said first frequency with said alternating current of double said second frequency to produce a predetermined composite output signal in which the components of the waveshape of said output bear a predetermined relation with respect to magnitude and periodicity thereof, said amplifying means effective in response to receipt of said composite output from said tapped network to amplify said composite output signal to a desired magnitude.

5. An electronic tone generator as claimed in claim 4, in which the said first frequency bears a predetermined relation to the said second frequency, circuit means for connecting said alternating current power supply to said oscillator, said means providing a path for said alternation signals from said power supply, said alternation signals controlling the oscillation of said oscillator to preserve the said relationship between the two frequencies regardless of any substantial voltage variation of said alternating current power supply.

6. A varying impedance device comprising an oscillator having a plurality of plate-cathode circuits, a non-linear element connected in one of said plate-cathode circuits, a network including a tap connected in shunt with the said one of said plate-cathode circuits, said non-linear element effective in response to energization of the said one of said plate-cathode circuits during oscillation of said oscillator to decrease its inherent non-operative resistance to a low value thereby presenting a low voltage signal at said tap, said non-linear element effective in response to deenergization of said plate-cathode circuit to return to its normal non-operative high resistance value thereby presenting a high voltage signal at said tap.

7. An electronic tone generator for generating signalling current comprising a first and a second oscillator, the output frequencies of said oscillators bearing a predetermined relation to each other, a plurality of plate-cathode circuits associated with the said second oscillator, an amplifier, a non-linear element connected in a particular one of said plurality of plate-cathode circuits, a network including a tap connecting said amplifier and said oscillators and connected in parallel with the said particular one of said plurality of plate-cathode circuits, and circuit means connecting said first and said second oscillators, said circuit means providing a path for applying the output of said first oscillator to said second oscillator to thereby keep the output of said second oscillator in a particular phase relationship with the output of said first oscillator, said non-linear element effective in response to energization of said particular circuit during the oscillation of the said second oscillator associated therewith to effectively shunt the signal voltage output of the said first oscillator, said non-linear element effective in response to the deenergization of said particular one of said plurality of plate-cathode circuits to substantially remove said shunt whereby the signal voltage at said tap varies periodically in accordance with the frequency of said second oscillator, said amplifier effective in response to said voltage variations for amplifying said variations to effect a desirable signalling current output.

8. An electronic tone generator as claimed in claim 7, said tap connected to an input of said amplifier, an output for said amplifier, circuit means effective in response to the receipt of said amplified voltage variations in said output to introduce a substantial amount of said voltage variations into said input to thereby eliminate distortion in said amplifier and to stabilize the operation thereof.

9. An electronic tone generator comprising a first oscillator, a first amplifier associated with said first oscillator, a source of alternating current, combining means including a proportioning network, means for connecting said source of alternating current and said first oscillator to said combining means, said combining means effective to combine the alternating current output of said first oscillator and the alternating current output of said source of alternating current to produce predetermined composite output, a first circuit means for connecting said composite output to said first amplifier, said first amplifier effective in response to the receipt of said composite output to amplify said output to desired levels a second circuit means effective in response to the receipt of a portion of said composite output to introduce said output into the input of said first amplifier to control the operation of said first amplifier, a second and a third oscillator, a second amplifier associated with said third oscillator, an impedance network connecting said second oscillator to the input of said second amplifier, said network also connected to said third oscillator, a third circuit means for applying a signal from said second oscillator to said third oscillator to keep the output of said third oscillator in a predetermined phase relation with the output of said second oscillator, non-linear resistance means associated with said third oscillator effective in response to the operation of said third oscillator to vary the impedance of said network in a predetermined manner, said input to said second amplifier being affected by the said variation in impedance in said impedance network, said second amplifier effective in response to receipt of said variations to amplify said variations to a desired signalling current output, and a fourth circuit means effective in response to the receipt of a portion of said signalling current output to introduce a substantial amount of said output into said second amplifier to thereby control the operation of said second amplifier.

10. A multiple signal tone generator comprising a first oscillator, a source of alternating current, a modulating means including non-linear elements and a tapped network composed of a plurality of impedances, a first circuit means for connecting the said first oscillator and said source of alternating current to said modulating means, said modulating means effective in response to the receipt of currents from said first oscillator and said source of alternating current to combine said currents into a composite output and to impress said output at a tap, the voltage of said output at said tap and the elements of the wave shape of said output being proportional to the ratio of the impedance value of said network to the impedance value of said modulating means, a second and a third oscillator, a second circuit means for applying a signal from said second oscillator to said third oscillator to control the phase relationship of the outputs of said second and said third oscillator, a third circuit means including a non-linear resistor associated with said third oscillator, a second tapped network composed of impedances connected to said circuit and the output of said second oscillator, said third circuit means effective in response to operation of said third oscillator to intermittently vary the impedance of said network whereby the output of said second oscillator is varied accordingly at said tap.

11. In a multiple signal tone generator as claimed in claim 10, a fourth circuit means for connecting said source of alternating current to said first oscillator, said fourth circuit means effective in response to receipt of a signal from said source to control the operation of said first oscillator, a fifth circuit means for applying a signal from said second oscillator to said third oscillator to control the operation of said third oscillator whereby both of the said controlled oscillators oscillate at predetermined rates which are multiples of the frequencies of the said controlling signals.

References Cited in the file of this patent

UNITED STATES PATENTS

| | | |
|---|---|---|
| 1,998,119 | Cox | Apr. 16, 1935 |
| 2,152,016 | Baesecke | Mar. 28, 1939 |
| 2,306,121 | Hagen | Dec. 22, 1942 |
| 2,414,795 | Brandt | Jan. 28, 1947 |
| 2,541,060 | Hester et al. | Feb. 13, 1951 |